(12) United States Patent  (10) Patent No.: US 7,380,860 B2
Dolan  (45) Date of Patent: Jun. 3, 2008

(54) WINDSHIELD FASTENING DEVICE

(76) Inventor: Frank Dolan, 1411 Marvin Griffin Rd., Augusta, GA (US) 30906

( * ) Notice: Subject to any disclaimer, the term of this patent is extended or adjusted under 35 U.S.C. 154(b) by 0 days.

(21) Appl. No.: 11/551,594

(22) Filed: Oct. 20, 2006

(65) Prior Publication Data

US 2007/0040408 A1  Feb. 22, 2007

Related U.S. Application Data

(63) Continuation of application No. 10/833,898, filed on Apr. 26, 2004, now abandoned.

(60) Provisional application No. 60/465,411, filed on Apr. 25, 2003.

(51) Int. Cl.
*B60J 1/06* (2006.01)

(52) U.S. Cl. .......................... 296/86; 296/84.1

(58) Field of Classification Search ............... 296/84.1, 296/86, 87, 88, 93
See application file for complete search history.

(56) References Cited

U.S. PATENT DOCUMENTS

| 5,195,797 | A | * | 3/1993 | Hobbs | 296/77.1 |
| 5,385,379 | A | * | 1/1995 | Heavner | 296/84.1 |
| 5,385,380 | A | * | 1/1995 | Heavner | 296/84.1 |
| 5,954,385 | A | * | 9/1999 | Moore et al. | 296/96.2 |

* cited by examiner

*Primary Examiner*—Lori L Lyjak
(74) *Attorney, Agent, or Firm*—Alston & Bird LLP

(57) ABSTRACT

A windshield system according to particular embodiments of the invention comprises: (1) a first windshield portion defining a windshield fastener receiving opening; (2) a second windshield portion connected to rotate between: (A) a closed position, in which the second windshield portion is substantially coplanar with the first windshield portion, and (B) an open position, in which the first and second windshield portions are spaced apart from, and co-facing, each other; and (3) a windshield fastener that is adapted for maintaining the second windshield portion in an open or a closed position. In particular embodiments, at least a portion of the windshield fastener is disposed within the windshield fastener receiving opening.

27 Claims, 12 Drawing Sheets

WINDSHIELD FASTENING DEVICE

CROSS-REFERENCE TO RELATED APPLICATIONS

This application is a continuation of U.S. application Ser. No. 10/833,898, filed Apr. 26, 2004, now abandoned which claims the benefit of priority from U.S. Provisional Patent Application Ser. No. 60/465,411, filed on Apr. 25, 2003, both of which are hereby incorporated by reference.

FIELD OF THE INVENTION

This invention relates generally to fastening devices for retaining the windshield of a vehicle, such as a golf cart, in a relatively fixed position relative to the vehicle.

BACKGROUND OF THE INVENTION

As will be understood by one skilled in the art, current golf carts typically include a two-part windshield that includes a transparent upper portion and a transparent lower portion. Typically, the lower portion is fixedly attached to the golf cart so that it can not move relative to the golf cart's body. The upper windshield portion, however, is usually attached to the lower windshield portion by a hinge. This allows users to move the upper windshield portion from a closed to an open position.

When the upper windshield portion in the closed position, the upper windshield portion is positioned above the lower windshield portion. In this closed position, the upper and lower portions of the windshield cooperate to form a substantially continuous, planar windshield that shields the golf cart's driver from rain and wind as they drive the golf cart.

When the upper windshield portion is in the open position, the upper and lower portions of the windshield are substantially parallel to, and offset from each other, and the vertical position of the upper and lower windshield portions is about the same. In this closed position, the area immediately above the lower windshield portion of the windshield is open to the elements. This allows wind to pass above the lower windshield portion to cool the driver as the driver drives the golf cart from place to place.

Prior art golf carts typically include flexible rubber fasteners for holding the upper windshield portion in the open and closed positions. These rubber fasteners are typically attached to the upper and/or lower portions of the windshield using an adhesive substance such as glue.

One disadvantage associated with these prior art golf carts is that the adhesive used to attach the rubber fasteners to the golf cart's windshield often deteriorates over time, especially after prolonged exposure to the sun. As a result, the rubber fasteners often become detached from the golf carts. Consequently, the rubber fasteners must frequently be replaced, which is both inconvenient and expensive.

Accordingly, there is a need for improved fasteners for golf cart windshields that are configured for being attached to the windshields in a more robust fashion.

SUMMARY OF THE INVENTION

A method of securing a fastener to the windshield of a golf cart according to one embodiment of the invention comprises the steps of: (1) providing a windshield that defines a windshield opening; (2) providing a fastener that comprises a male portion and a body portion; and (3) securing the fastener to the windshield by inserting the male portion into the windshield opening. In a particular embodiment of the invention, the fastener is maintained in place relative to the windshield via the frictional contact between the male portion and the windshield.

BRIEF DESCRIPTION OF THE DRAWINGS

Having thus provided a brief description of various embodiments of the invention, certain embodiments of the invention will now be described with reference to the drawings listed below, which are not necessarily drawn to scale. Like numbers refer to like elements throughout.

DETAILED DESCRIPTION OF THE INVENTION

First Embodiment of the Invention

Figure 3:
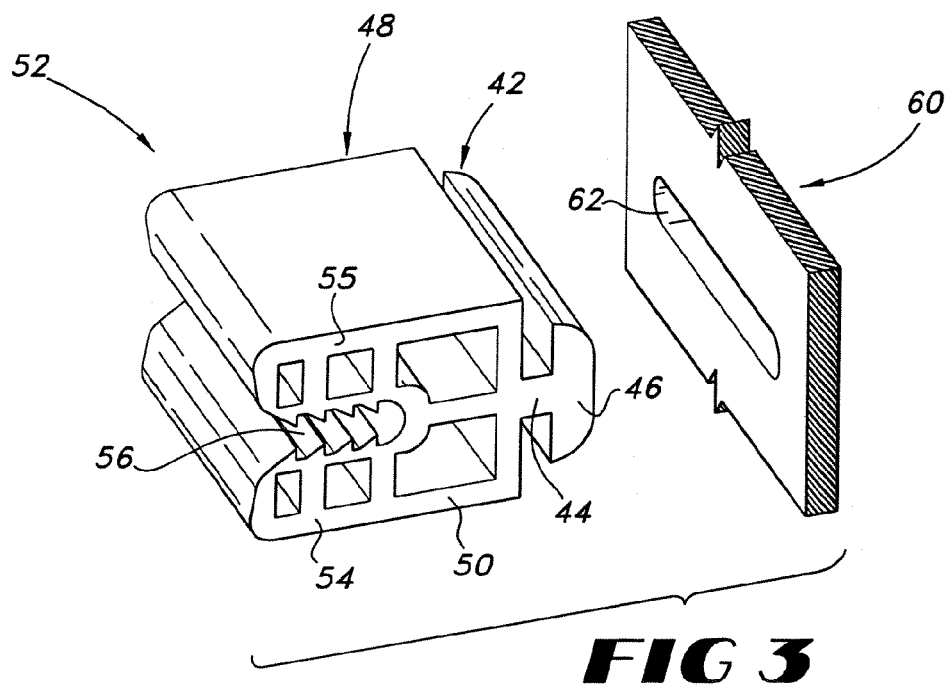
FIG. 3 is a perspective view of a lower attaching member and a portion of a lower windshield portion according to a first embodiment of the invention.
Figure 4:
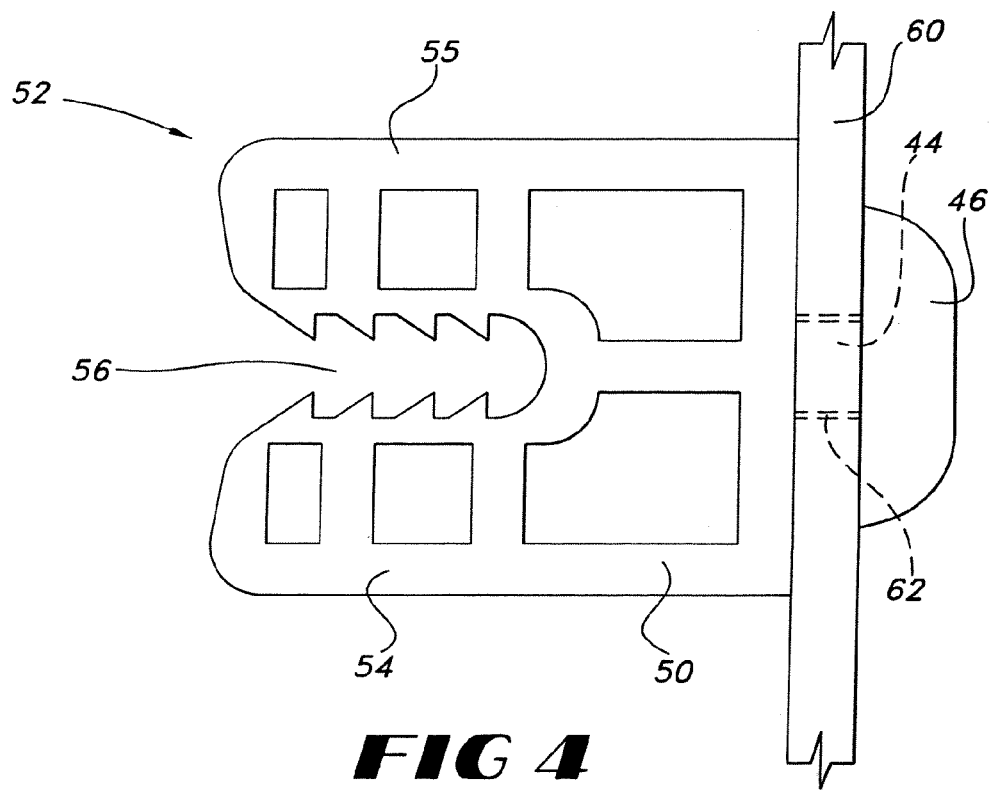
FIG. 4 is a side view of the lower attaching member and lower windshield portion of FIG. 3.
Figure 5:
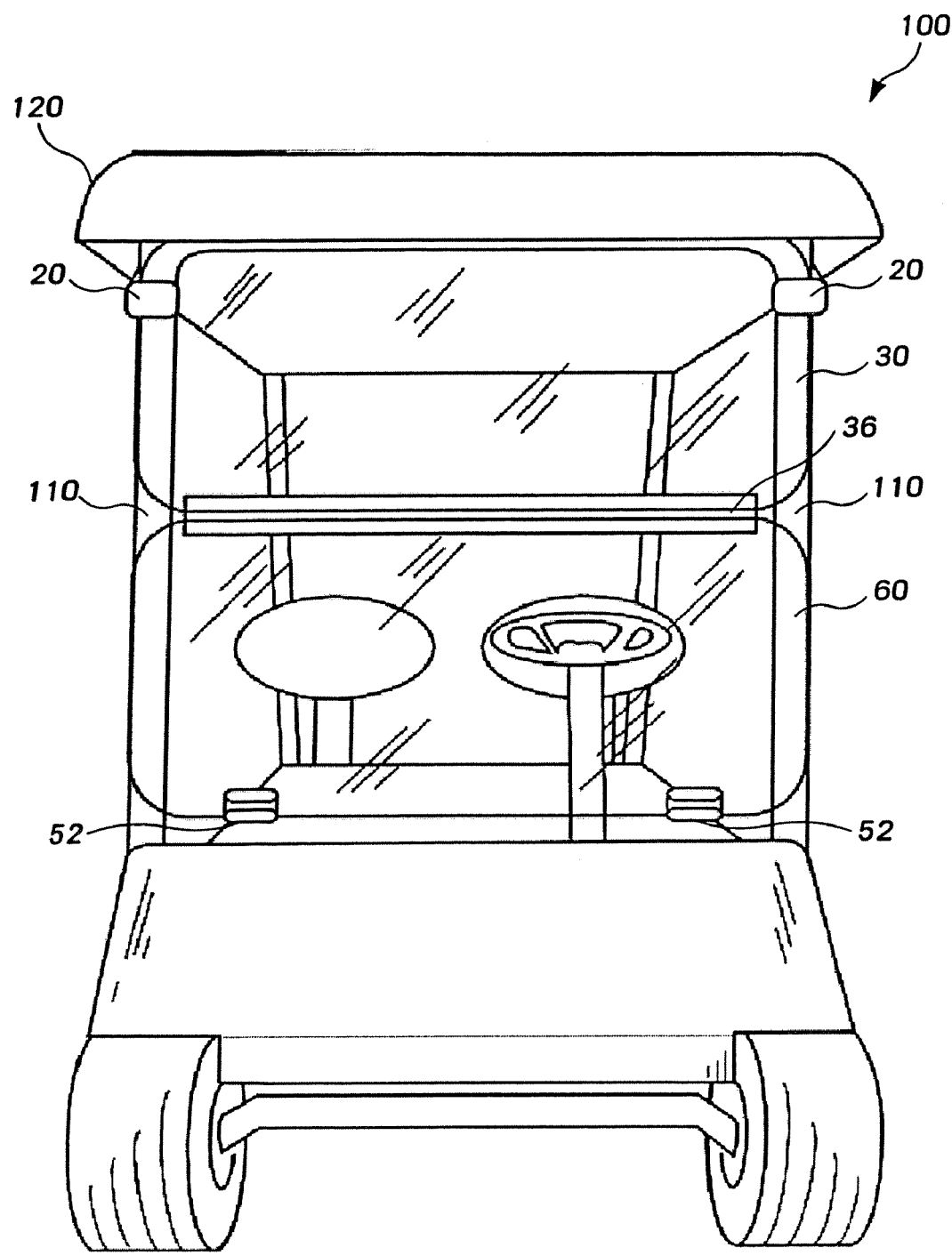
FIG. 5 is a front view of a golf cart that includes a windshield fastening system according to a first embodiment of the invention.
Figure 6:
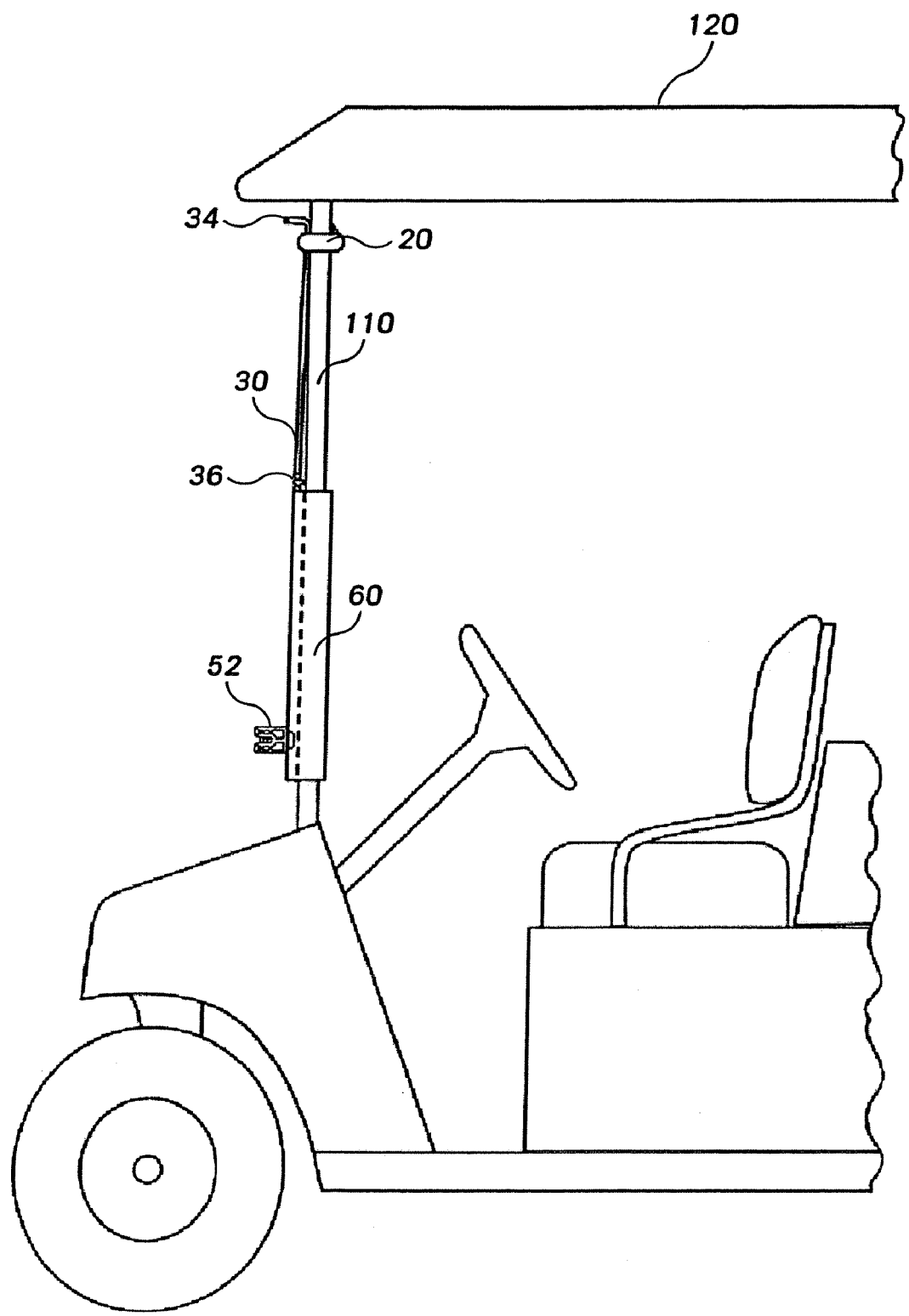
FIG. 6 is a side view of a golf cart that includes a windshield fastening system according to a first embodiment of the invention. This figure depicts the upper windshield portion in a closed position.
Figure 7:
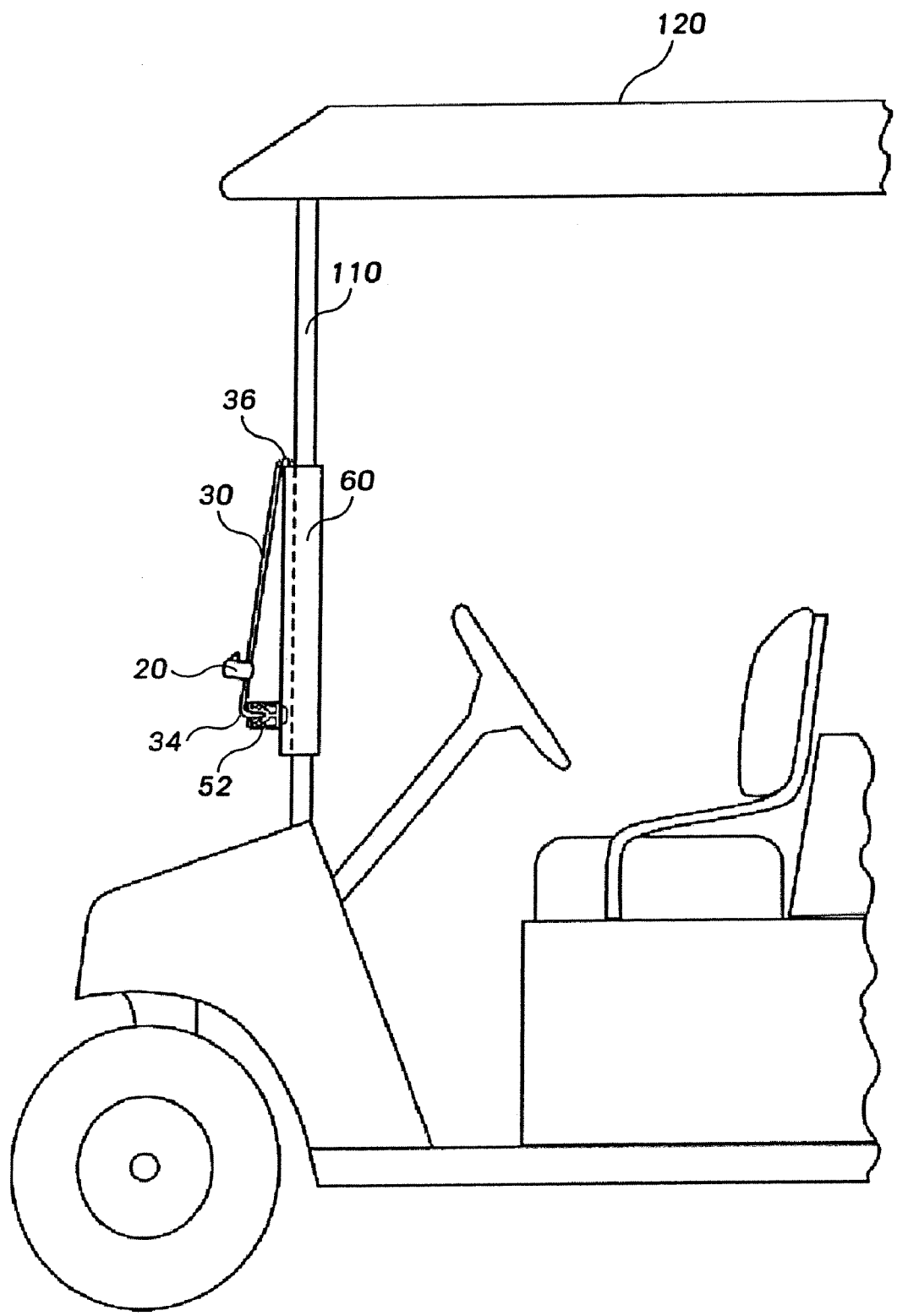
FIG. 7 is a side view of a golf cart that includes a windshield fastening system according to a first embodiment of the invention. This figure depicts the upper windshield portion in an open position.

FIGS. 1-7 depict a windshield fastening system according to a first embodiment of the invention. More particularly, FIGS. 5-7 depict a golf cart 100 that includes a windshield comprising an upper windshield portion 30 and a lower windshield portion 60. The lower edge of the upper windshield portion 30 is attached to the upper edge of the lower windshield portion 60 via a hinge 36 as shown in FIGS. 5-7. As will be understood by one skilled in the relevant field, the upper windshield portion 30 is configured to be moved from a closed position, which is depicted in FIGS. 5 and 6, to an open position, which is depicted in FIG. 7.

As may be understood from FIGS. 5-7, the windshield fastening system includes two upper attaching members 20 and two lower attaching members 52. The upper attaching members 20 are used to maintain the upper windshield portion 30 in the closed position. Similarly, the lower attaching members 52 are used to maintain the upper windshield portion 30 in the open position. The structure and operation of the upper and lower attaching members 20, 52 will now be discussed in greater detail.

Upper Attaching Members—First Embodiment

Figure 1:
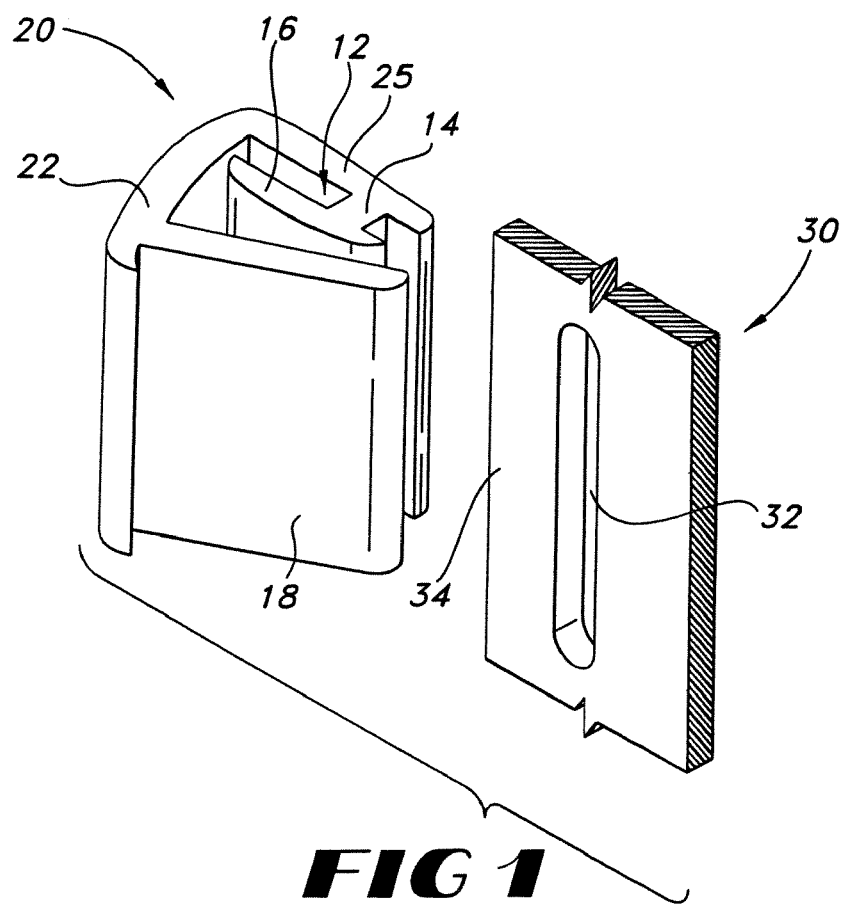
FIG. 1 is a perspective view of an upper attaching member and an end portion of an upper windshield portion according to a first embodiment of the invention.
Figure 2:
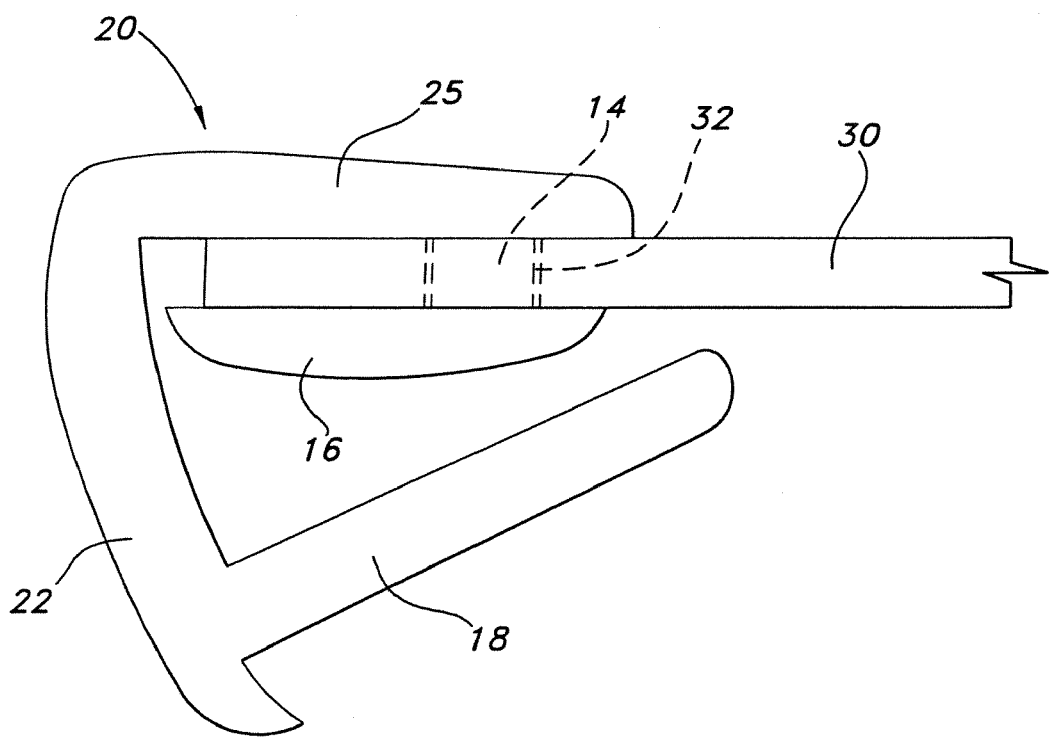
FIG. 2 is a top view of the upper attaching member and upper windshield portion of FIG. 1.

The structure of an upper attaching member 20 according to a first embodiment of the invention is depicted in FIGS. 1 and 2. As may be understood from these figures, the upper attaching member 20 includes a substantially planar rear portion 25, a substantially planar connector portion 22 that extends outwardly from and generally perpendicular to, the rear portion 25, and a front, substantially planar front portion 18 that extends outwardly from, and generally perpendicular to, the connector portion 22. As shown in FIGS. 1 and 2, the upper attaching member's rear portion 25, connector portion 22, and front portion 18 cooperate to form a substantially U-shaped exterior structure of the upper attaching member 20. In a preferred embodiment of the invention, this exterior structure is made of a flexible material, such as rubber, so that the connector portion 22 and front portion 18 may be moved relative to the rear portion 25.

The upper attaching member 20 further includes a fastening member 12 for attaching the upper attaching member 20 to the upper windshield portion 30 of the golf cart 100 as discussed below. This fastening member 12, which preferably functions as a "male" fastener, preferably includes a substantially planar head portion 16 that is substantially parallel to, and offset from the interior surface of the upper attaching member's rear portion 25. The fastening member 12 also includes a neck portion 14 that extends between the interior surface of the upper attaching member's rear portion 25 and an interior surface of the head portion 16 as shown in FIGS. 1 and 2. In a preferred embodiment of the invention, the length of the neck portion 14 is about equal to the thickness of the upper windshield portion 30.

As may be understood from FIGS. 1 and 2, the upper windshield portion 30 defines an elongate opening 32 that is immediately adjacent an outer edge 34 of the upper windshield portion 30. A cross section of this opening is preferably about the same size and shape as a cross-section of the upper attaching member's neck portion 14. Also, the head and neck portions 14 and 16 of the upper attaching member 20 are preferably made of a flexible material.

To install the upper attaching member 20 on the upper windshield portion 30, a user simply pushes the upper attaching member's head portion 16 through the elongate opening 32 in the upper windshield portion 30 until the interior surface of the head portion 16 is adjacent the exterior surface of the upper windshield portion 30. In this position, which is shown in FIG. 2, the neck portion 14 extends through the elongate opening 32. As may be understood from FIG. 2, in this position, the frictional contact between the head, rear, and neck portions of the upper attaching member 20 with the upper portion of the upper windshield portion 30 serve to maintain the upper attaching member 20 in place relative to the upper windshield portion 30.

To use the upper attaching members 20, the user rotates the upper windshield portion 30 from the open position (shown in FIG. 7) to the closed position (shown in FIG. 6). Just before the upper windshield portion 30 reaches the fully closed position, the user manually flexes the upper attaching member's front and connector portions 18, 22 so that one of the golf cart's roof support poles 110 is received within an interior portion defined by the front and connector portions 18, 22 of the upper attaching member 20. The user then releases front and connector portions 18, 22 so that the front and connector portions 18, 22 contact the back and side portions of the support pole 110. In this position, shown generally in FIG. 6, the upper attaching member 20 extends around the support pole 110 and holds the upper windshield portion 30 in the closed position.

To release the upper windshield portion 30 from the closed position, the user simply flexes the front and connector portions 18, 22 again so that the upper attaching member 20 releases the support pole 110. The user then rotates the upper windshield portion 30 about the hinge 36 until the upper windshield portion 30 is in the open position as shown in FIG. 7.

Lower Attaching Members—First Embodiment

The structure of a lower attaching member 52 according to one embodiment of the invention is depicted in FIGS. 3 and 4. As may be understood from these figures, the lower attaching member 52 includes a body portion 50 that comprises an upper arm 55 and a lower arm 54. The upper arm 55 and lower arm 54 are spaced apart from each other to define a windshield lip receiving cavity 56. The upper and lower arms 54, 55 each preferably include teeth adjacent the receiving cavity 56 for gripping the upper lip 34 of a windshield as discussed below. The lower attaching member 52 further includes a neck portion 44 that is adjacent the body portion 50 and that extends between a head portion 46 of the lower attaching member 52 and the lower attaching member's body portion 50. As shown in FIG. 4, the length of this neck portion 44 is preferably substantially equal to the thickness of the lower windshield portion 60.

As may be understood from FIGS. 3-7, each lower attaching member 52 is attached to the lower windshield portion 60 adjacent the lower windshield portion's bottom edge. As may be understood from FIGS. 3, 4, and 5, each lateral side of the lower windshield portion 60 defines a substantially horizontal elongate receiving slot 62 that is dimensioned to receive the head and neck portions 44, 46 of the lower attaching member 52 as shown in FIG. 4. In a preferred embodiment of the invention, the head and neck portions 44, 46 are made of a flexible material, such as rubber, to allow the user to insert the head portion 46 through the receiving slot 62 so that the inner surface of the head portion 46 is adjacent an interior surface of the lower windshield portion 60 and so that the lower attaching member's neck portion 44 is disposed within the receiving slot 62. In a preferred embodiment of the invention, the body, neck, and head portions 50, 44, 46 of the lower attaching member 52 are dimensioned so that the frictional contact between the body, neck and head portions of the lower attaching member 52 and the lower windshield portion 60 hold the lower attaching member 52 in place relative to the lower windshield portion 60.

To use the lower attaching members 52, the user rotates the upper windshield portion 30 from the closed position (shown in FIGS. 5 and 6) to the open position (shown in FIG. 7). Just before the upper windshield portion 30 reaches the fully open position, the upper lip 34 of the upper windshield portion 30 (which extends outwardly from, and substantially perpendicular to, the upper windshield portion 30) enters each lower attaching member's receiving slot 56. The upper lip is then held in place within the lower attaching members' 53 receiving slots 56 by teeth adjacent the receiving slots 56. This, in turn, holds the upper windshield portion 30 in the open position as shown in FIG. 7.

To release the upper windshield portion 30 from the open position, the user briskly pulls the upper windshield portion 30 away from the lower attaching member 52. This causes the lower attaching member 52 to release the upper windshield portion's upper lip 34. The user then rotates the upper windshield portion 30 about the hinge 36 until the upper windshield portion 30 is in the closed position as shown in FIGS. 5 and 6.

Second Embodiment of the Invention

Figure 10:
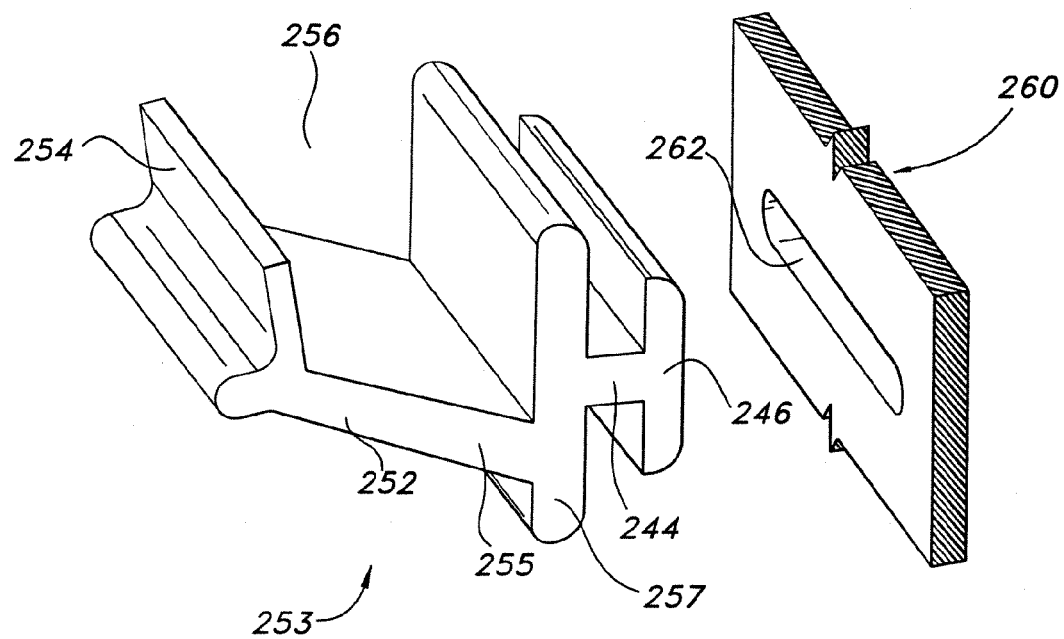
FIG. 10 is a perspective view of a lower attaching member and a portion of a lower windshield portion according to a second embodiment of the invention.
Figure 11:
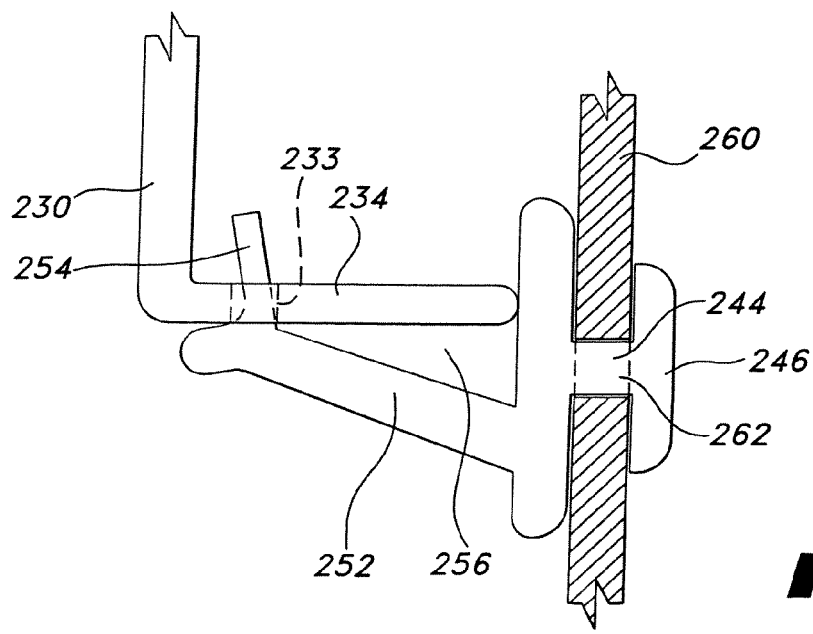
FIG. 11 is a side view of the lower attaching member and a lower windshield portion of FIG. 10.
Figure 12:
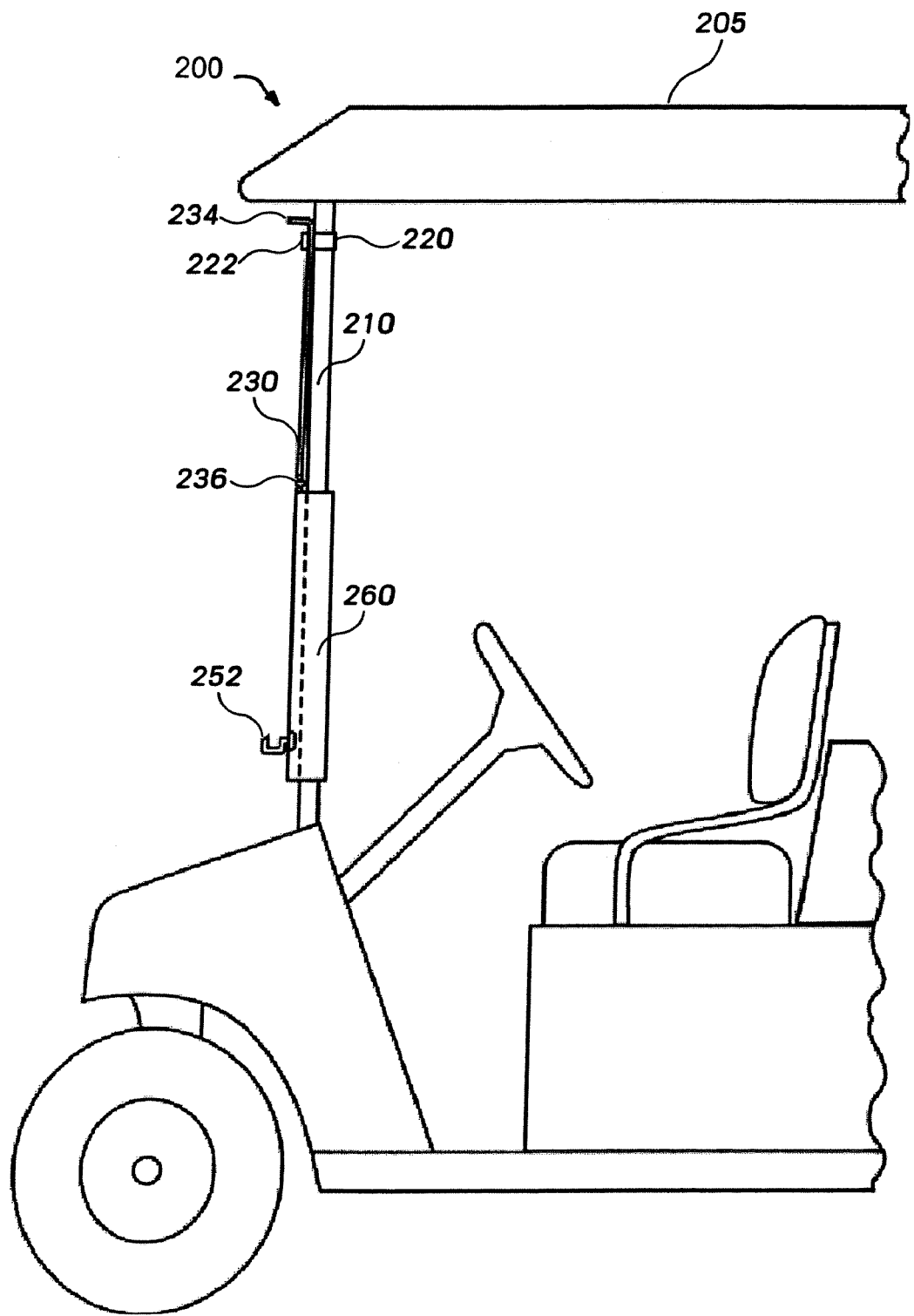
FIG. 12 is a side view of a golf cart that includes a windshield fastening system according to another embodiment of the invention. This figure depicts the upper windshield portion in a closed position.
Figure 13:
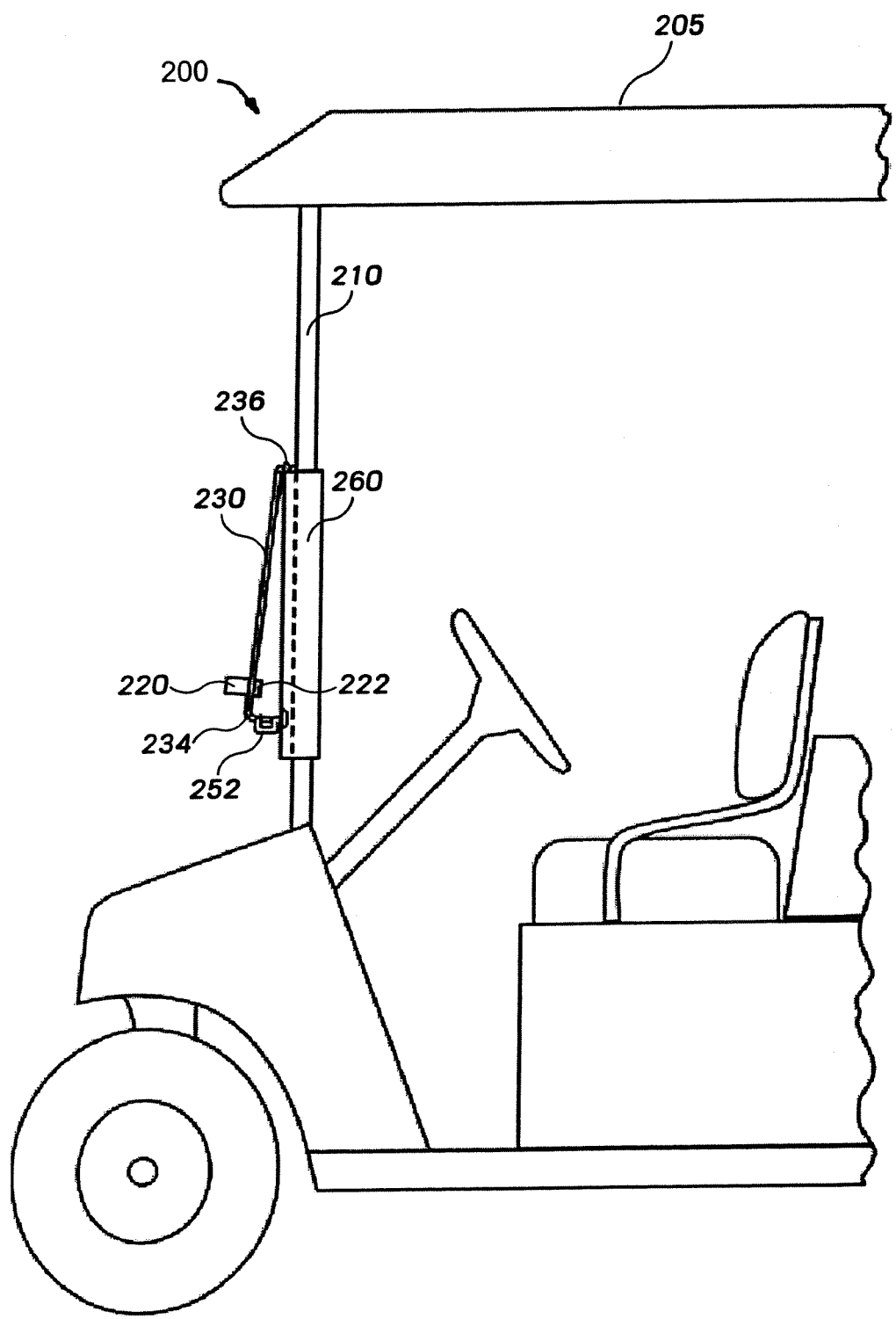
FIG. 13 is a side view of a golf cart that includes the windshield fastening system of FIG. 12. This figure depicts the upper windshield portion in an open position.

FIGS. 8-13 depict a windshield fastening system according to a second embodiment of the invention. More particularly, these figures depict a golf cart 200 that includes a windshield comprising an upper windshield portion 230 and a lower windshield portion 260. The lower edge of the upper windshield portion 230 is attached to the upper edge of the lower windshield portion 260 by a hinge 236 as shown in FIGS. 12-13. As will be understood by one skilled in the relevant field, the upper windshield portion 230 is configured to be moved from a closed position, which is depicted in FIG. 12, to an open position, which is depicted in FIG. 13.

As was the case with the first embodiment described above, this second embodiment of the windshield fastening system includes two upper attaching members 220, and two lower attaching members 252. The upper attaching members 220 are preferably attached to the upper windshield portion 230 in substantially the same place (relative to the upper windshield portion 30, 230) as the upper attaching members 20 shown in FIG. 5, which was discussed above in relation to the first embodiment of the invention. Similarly, the lower attaching members 252 are preferably attached to the lower windshield portion 260 in substantially the same place (relative to the lower windshield portion 60, 260) as the lower attaching members 52 shown in FIG. 5.

The upper attaching members 220 are used to maintain the upper windshield portion 230 in the closed position. Similarly, the lower attaching members 252 are used to maintain the upper windshield portion 230 in the open position. The structure and operation of these upper and lower attaching members 220, 252 will now be discussed in greater detail.

Upper Attaching Members—Second Embodiment

Figure 8:
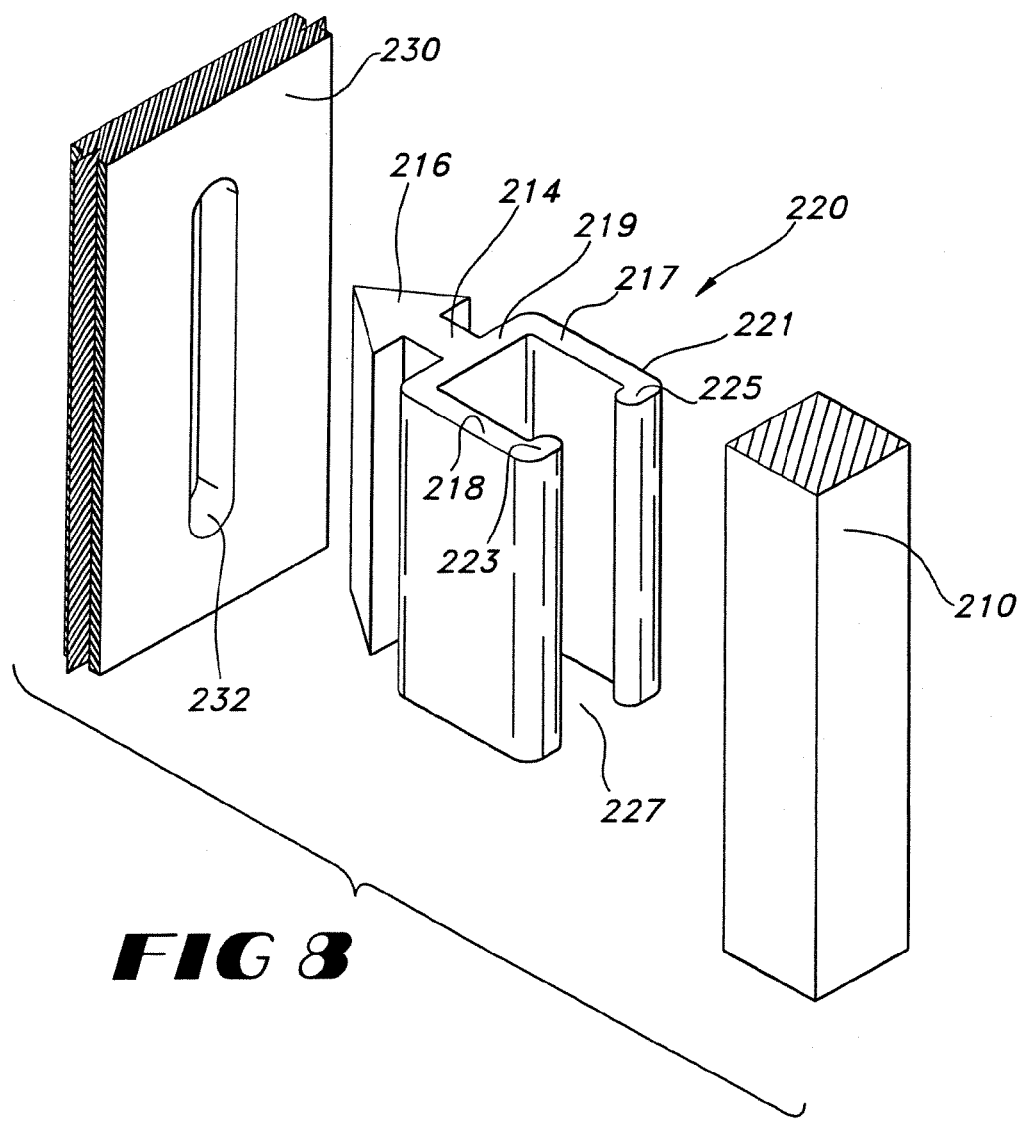
FIG. 8 is a perspective view of an upper attaching member and an end portion of an upper windshield portion according to a second embodiment of the invention.
Figure 9:
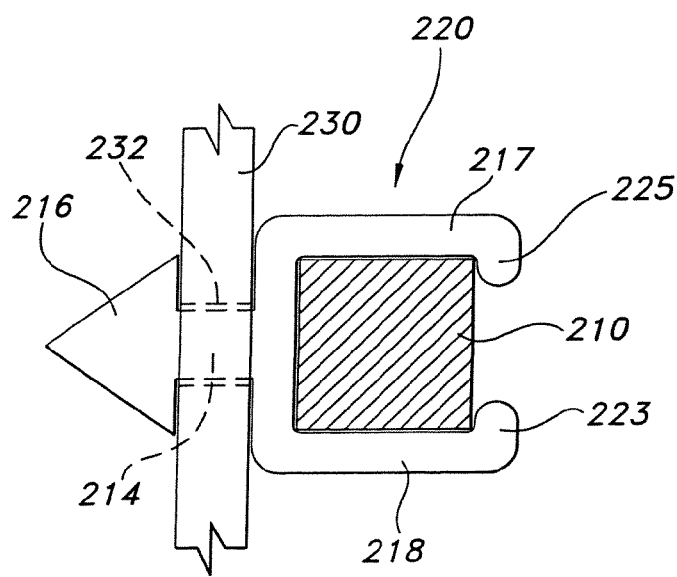
FIG. 9 is a top view of the upper attaching member and upper windshield portion of FIG. 8.

The structure of an upper attaching member 220 according to a second embodiment of the invention is depicted in FIGS. 8 and 9. As may be understood from these figures, the upper attaching member 220 includes a body portion 221 that comprises: (1) a substantially planar base portion 219; (2) a substantially planar first gripping arm 217 that extends outwardly from, and perpendicular to, a first exterior face of the base portion 219; and (3) a substantially planar second gripping arm 218 that extends outwardly from, and perpendicular to, the first exterior face of the base portion 219 so that the second gripping arm 218 is offset from, and substantially parallel to, the first gripping arm 217.

As shown in FIGS. 8 and 9, the base portion 219, first gripping arm 217 and second gripping arm 218 are oriented to define a support pole receiving cavity 227 that preferably includes a cross section that is about the same size and shape as a cross section of a golf cart support pole 110, 210. (Note: The golf cart support pole 210 in FIGS. 8 and 9 corresponds to the golf cart support poles 110 shown in FIG. 5, which is discussed above.) In a preferred embodiment of the invention, the first gripping arm 217 includes an outer lip 225 that extends outwardly from an interior surface of the first gripping arm's outer end generally toward the second gripping arm 218. Similarly, the second gripping arm 218 includes an outer lip 223 that extends outwardly from an interior surface of the second gripping arm's outer end generally toward the first gripping arm 217. These outer lips 223, 225 serve to further define the support pole receiving cavity 227.

The upper attaching member 220 further includes a head portion 216 and a neck portion 214 that are adjacent the upper attaching member's body portion 221. As may be understood from FIGS. 8 and 9, the head and neck portions 214, 216 are preferably dimensioned to hold the body portion 221 in place relative to the upper windshield portion 230. The neck portion 214 extends between the upper attaching member's head and body portions 216, 221. As shown in FIGS. 8 and 9, the length of the neck portion 214 is preferably substantially equal to the thickness of the upper windshield portion 230.

As may be understood from FIGS. 5, 12, and 13, each upper attaching member 220 is attached to the upper windshield portion 230 adjacent an outer edge of the upper windshield portion 230. As may be understood from FIGS. 8 and 9, each lateral side of the upper windshield portion 230 defines a substantially vertical elongate receiving slot 232 that is dimensioned to receive the head and neck portions 216, 214 of the upper attaching member 220 as shown in FIG. 9.

In a preferred embodiment of the invention, the head and neck portions 216, 214 are made of a flexible material, such as rubber, to allow the user to insert the head portion 216 through the receiving slot 232 so that the inner surface of the head portion 216 is adjacent an exterior surface of the upper windshield portion 230 and so that the upper attaching member's neck portion 214 is disposed within the receiving slot 232. In a preferred embodiment of the invention, the body, neck, and head portions 221, 214, 216 of the upper attaching member 220 are dimensioned so that the frictional contact between the body, neck and head portions 221, 214, 216 of the upper attaching member 220 and the upper windshield portion 230 hold the upper attaching member 220 in place relative to the upper windshield portion 230.

To use the upper attaching members 220, the user rotates the upper windshield portion 230 from the open position (shown in FIG. 13) to the closed position (shown in FIG. 12). Just before the upper windshield portion 230 reaches the fully closed position, the outer surfaces of each upper windshield portion's first and second gripping arms 217, 218 contact the outer lateral sides of a golf cart support pole 210. This serves to flex the first and second gripping arms 217, 218 away from each other so that the upper windshield portion 230 may receive the support pole 210 within its support pole receiving cavity 227.

Once the upper windshield portion 230 reaches the fully closed position (shown in FIGS. 9 and 12), the outer lips 223, 225 of the first and second gripping arms 217, 218 wrap around the interior side of the golf cart support pole 210 to hold the upper attaching member 220 and the upper windshield portion 230 in place relative to the golf cart support pole 210.

To release the upper windshield portion 230 from the closed position, the user simply pulls or pushes the upper windshield portion 230 away from the golf cart support poles 210 and toward the open position (shown in FIG. 13). The pulling or pushing motion serves to flex the first and second gripping arms 217, 218 away from each other and also to push the upper attaching members 220 away from the golf cart support poles 210. This, in turn, causes the upper attaching members 220 to release the golf cart support poles 210. The user then rotates the upper windshield portion 230 about the hinge 236 until the upper windshield portion 230 is in the open position as shown in FIG. 13.

Lower Attaching Members—Second Embodiment

The structure of a lower attaching member 252 according to a second embodiment of the invention is depicted in FIGS. 10-11. An alternative embodiment of this lower attachment member 252 is shown in FIGS. 12-13. As may be understood from these figures, the lower attaching member 252 preferably includes a substantially U-shaped body portion 253 that comprises an outer latching member 254, a central member 255 and an interior support member 257. As may be understood from Figure, this U-shaped body portion 253 preferably defines a recess 256 for receiving the front portion of the upper windshield portion's upper lip 234.

In a preferred embodiment of the invention, both the outer latching member 254 and the interior support member 257 are substantially planar. The outer latching member 254 is preferably spaced apart from, and substantially parallel to, the interior support member 257. The central member 255 is preferably substantially planar and is disposed between the outer latching member 254 and the interior support member 257. In a preferred embodiment of the invention, the central member 255 is substantially perpendicular to both the outer latching member 254 and interior support member 257.

The lower attaching member 252 further includes a head portion 246 and a neck portion 244 that are adjacent the lower attaching member's body portion 253. As may be understood from FIGS. 10 and 11, the head and neck portions 244, 246 are preferably dimensioned to hold the body portion 253 in place relative to the lower windshield portion 260. The neck portion 244 extends between the lower attaching member's head and body portions 246, 253. As shown in FIGS. 10 and 11, the length of the neck portion 244 is preferably substantially equal to the thickness of the lower windshield portion 260.

As may be understood from FIGS. 12-13, each lower attaching member 252 is attached to the lower windshield portion 260 adjacent the lower windshield portion's bottom edge. As may be understood from FIGS. 10 and 11, each lateral side of the lower windshield portion 260 defines a substantially horizontal elongate receiving slot 262 that is dimensioned to receive the head and neck portions 244, 246 of the lower attaching member 252 as shown in FIG. 11. In a preferred embodiment of the invention, the head and neck portions 244, 246 are made of a flexible material, such a rubber, to allow the user to insert the head portion 246 through the receiving slot 262 so that the inner surface of the head portion 246 is adjacent an interior surface of the lower windshield portion 260 and so that the lower attaching member's neck portion 244 is disposed within the receiving slot 262. In a preferred embodiment of the invention, the body, neck, and head portions 253, 244, 246 of the lower attaching member 252 are dimensioned so that the frictional contact between the body, neck and head portions 253, 244, 246 of the lower attaching member 252 and the lower windshield portion 260 hold the lower attaching member 252 in place relative to the lower windshield portion 260.

In a preferred embodiment of the invention, and as is shown in FIG. 11, the upper windshield portion 230 includes a preferably planar upper lip 234 along the upper edge of the upper windshield portion 230. This upper lip 234 preferably extends outwardly from, and substantially perpendicular to, the outer face of the upper windshield portion 230. The upper lip 234 preferably includes a receiving slot 233 that is dimensioned to align with the latching member 254 of a corresponding lower attaching member 252 when the upper windshield portion 230 is in the open position, as shown in FIGS. 11 and 13. In a preferred embodiment of the invention, the upper lip 234 includes two receiving slots 233, each receiving slot 233 corresponding to a single lower attaching member 252.

In a preferred embodiment of the invention, each receiving slot 233 defines a cross section that is substantially the same size and shape as a cross section of the latching member 254 of the corresponding lower attaching member 252. Furthermore, as shown in FIG. 11, each receiving slot is preferably configured so that the latching member 254 of the corresponding lower attaching member 252 aligns with the receiving slot 233 when the upper windshield portion 230 is in the open position.

To use the lower attaching members 252, the user rotates the upper windshield portion 230 from the closed position (shown in FIG. 12) to the open position (shown in FIGS. 11 and 13). Just before the upper windshield portion 230 reaches the fully open position, the upper lip 234 of the upper windshield portion 230 engages the latching members 254 of the lower attaching members 252, which flexes the latching members 254 in a generally downward direction. As the upper windshield portion 230 continues to move into the fully open position, the latching members 254 slide along the outer surface of the upper lip 234 of the upper windshield portion 230 until the upper windshield portion 230 is in the fully open position.

Finally, when the upper windshield portion 230 is in the fully open position, each latching member 254 aligns with its corresponding receiving slot 233. When this occurs, the latching members 254 move into place within the receiving slots 233 due to the resilient structure of the latching members 254. The latching members 254 then hold the upper windshield portion 230 in the open position as shown in FIGS. 11 and 13.

To release the upper windshield portion 230 from the open position, the user briskly pulls the upper windshield portion 230 away from the lower attaching member 252. This causes the latching members 254 to flex and slide out of their respective receiving slots 233. As a result, the lower attaching members 252 release the upper windshield portion's upper lip 234. The user then rotates the upper windshield portion 230 about the hinge 236 until the upper windshield portion 230 is in the closed position as shown in FIG. 12.

In a preferred embodiment of the invention, the outer end of the latching members 254 are cut diagonally as shown in FIGS. 10 and 11 to facilitate the movement of the latching members 254 in to the receiving slots 233. However, as will be understood by one skilled in the relevant field, other configurations are possible.

Third Embodiment of the Invention

Figure 14:
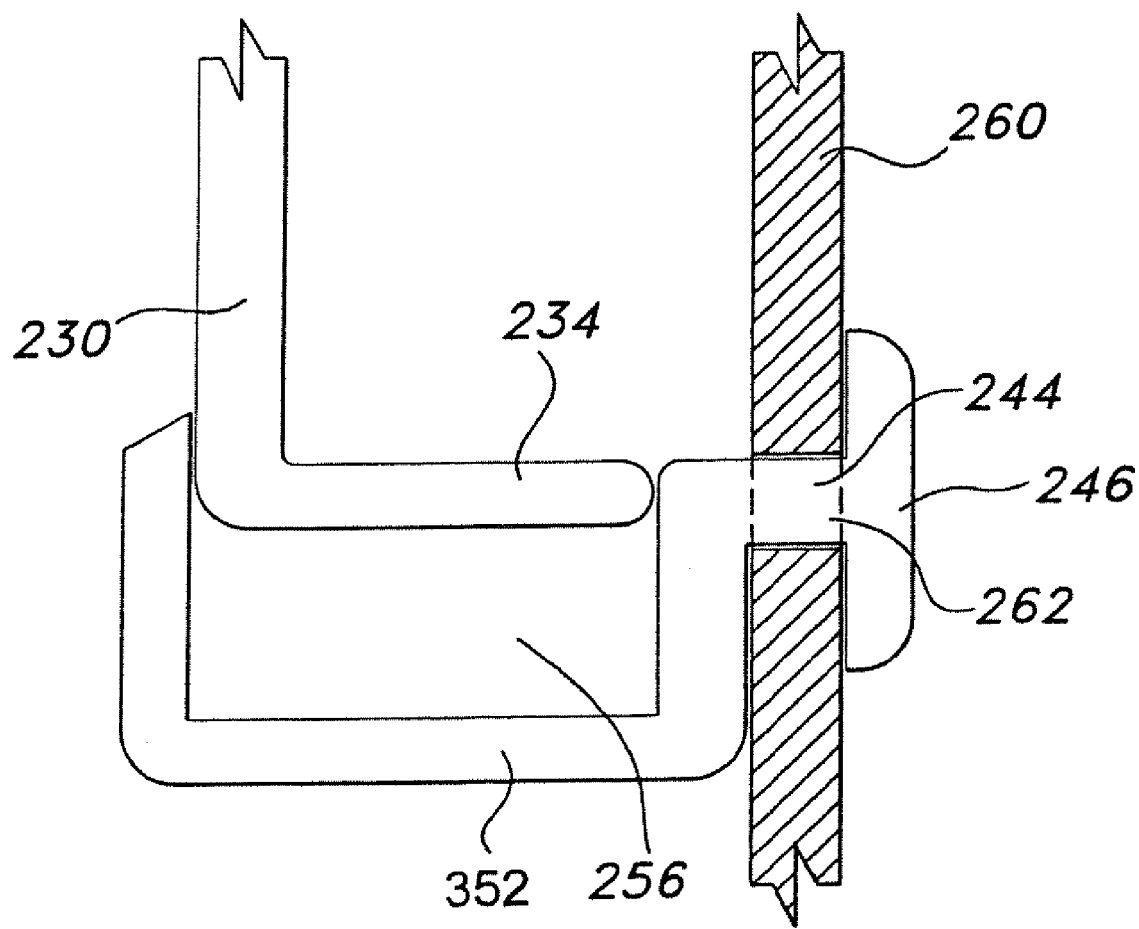
FIG. 14 is a side view of a lower attaching member and a lower windshield portion according to a third embodiment of the invention.
Figure 15:
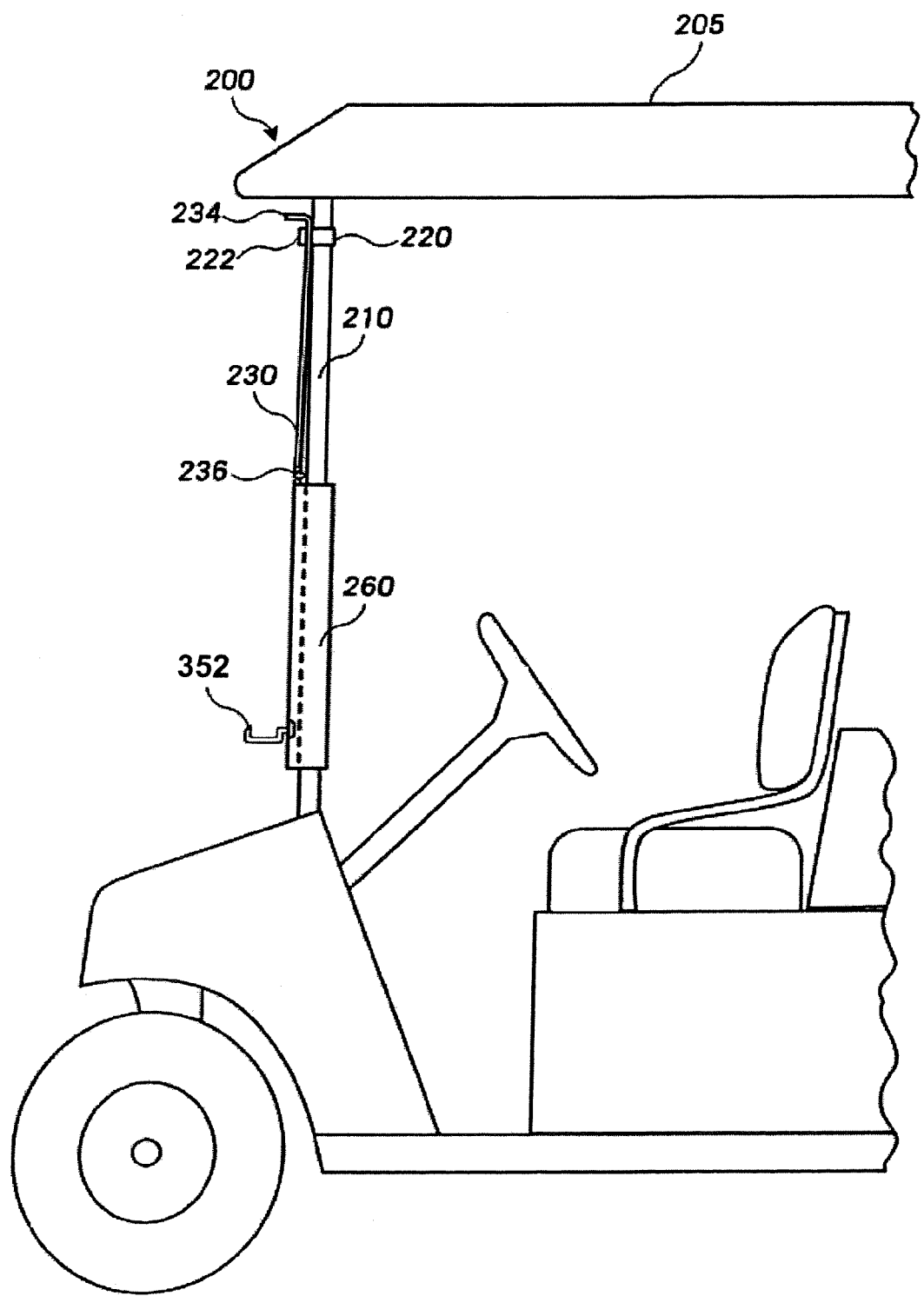
FIG. 15 is a side view of a golf cart that includes a windshield fastening system according to a third embodiment of the invention. This figure depicts the upper windshield portion in a closed position.
Figure 16:
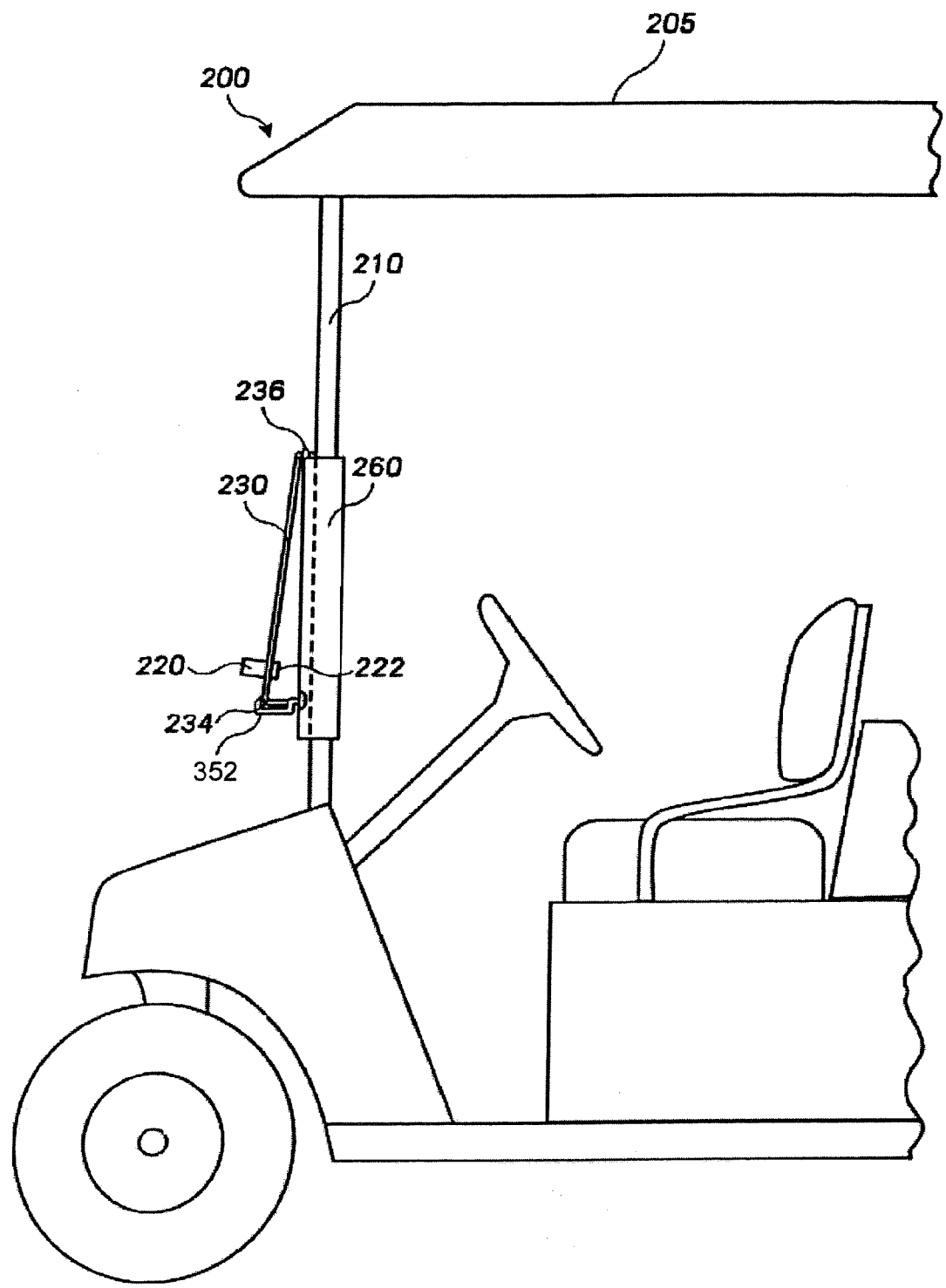
FIG. 16 is a side view of a golf cart that includes a windshield fastening system according to a third embodiment of the invention. This figure depicts the upper windshield portion in an open position.

A third embodiment of the invention is shown in FIGS. 14-16. As may be understood from these figures, this embodiment of the invention is preferably essentially identical to the second embodiment of the invention described above, except that the lower attaching members 352 in this embodiment of the invention are preferably dimensioned to define a slightly larger recess 256 than that defined by the lower attaching members 252 of the second embodiment of the invention. As shown in FIG. 14, the lower attaching members 352 are preferably configured to receive, within the recess 256 and in a substantially snug manner, an upper end portion of the upper windshield portion 230. In a preferred embodiment of the invention, each lower attaching member 256 is preferably configured to receive the upper windshield portion's upper lip 234 within the recess 256.

Selected Advantages of the Invention

Although the invention has many advantages over prior art windshield fastening systems, one key advantage of the present invention is that the upper and lower attaching members 20, 220, 52, 252, 352 are configured to be attached to the windshield without the use of adhesives. As a result, the upper and lower attaching members 20, 220, 52, 252, 352 of the current invention are more suitable for use in direct sunlight than prior art windshield fastening systems, which are typically attached to the windshield with adhesives that break down upon prolonged exposure to the sun.

Furthermore, the upper and lower attaching members 20, 220, 52, 252, 352 of the present invention are much easier to replace than prior art windshield fastening systems. This is due to the fact that the upper and lower attaching members 20, 220, 52, 252, 352 are attached to the windshield through frictional contact between the upper and lower attaching members 20, 220, 52, 252, 352 and the windshield, rather than with a strong adhesive.

CONCLUSION

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A windshield system comprising:
a first windshield portion defining a windshield fastener receiving opening, said windshield fastener receiving opening being a cutout in the first windshield portion;
a second windshield portion connected to rotate between: (1) a closed position, in which the second windshield portion is substantially coplanar with the first windshield portion, and (2) an open position, in which the first and second windshield portions are spaced apart from, and co-facing, each other; and
a windshield fastener that is adapted for maintaining the second windshield portion in the open position, wherein:
at least a portion of the windshield fastener is disposed within the windshield fastener receiving opening.

2. The windshield system of claim 1, wherein:
when the second windshield portion is in the closed position, the second windshield portion is disposed above the first windshield portion.

3. The windshield system of claim 1, wherein:
frictional contact between the windshield fastener and the first windshield portion serves to maintain the windshield fastener in place relative to the first windshield portion.

4. The windshield system of claim 3, wherein:
the windshield fastener receiving opening is a first windshield fastener receiving opening;
the windshield fastener is a first windshield fastener;
the first windshield portion defines a second windshield fastener receiving opening, said second windshield fastener receiving opening being a cutout in the first windshield portion;
the windshield system further comprises a second windshield fastener that is adapted for maintaining the second windshield portion in the open position;
at least a portion of the second windshield fastener is disposed within the second windshield fastener receiving opening; and
frictional contact between the second windshield fastener and the first windshield portion serves to maintain the second windshield fastener in place relative to the first windshield portion.

5. The windshield system of claim 1, wherein:
the windshield fastener comprises:
a body portion,
a head portion, and
a neck portion extending between the head portion and the body portion; and
frictional contact between the windshield fastener and the first windshield portion serves to maintain the windshield fastener in place relative to the first windshield portion; and
the head portion and the neck portion are dimensioned to hold the body portion in place relative to the first windshield portion by engaging said first windshield portion adjacent said windshield fastener opening.

6. The windshield system of claim 5, wherein:
the head and neck portions are adapted to allow a user to insert the head portion through the windshield fastener receiving opening so that an inner surface of the head portion is adjacent an interior surface of the first windshield portion and so that the neck portion is disposed within the windshield fastener receiving opening.

7. The windshield system of claim 6, wherein a thickness of the neck portion is substantially equal to a thickness of the first windshield portion.

8. The windshield system of claim 6, wherein the windshield fastener receiving opening is an elongate slot.

9. The windshield system of claim 5, wherein the body portion is substantially U-shaped.

10. The windshield system of claim 9, wherein the windshield system is adapted so that, in order to move the second windshield portion from the closed to the open position and to maintain the windshield portion in the open position:
   (A) a user rotates the second windshield portion from the closed position toward a fully open position;
   (B) just before the second windshield portion reaches the fully open position, an upper lip of the second windshield portion engages the windshield fastener, which causes the windshield fastener's body portion to flex in a generally downward direction; and
   (C) once the second windshield portion is in the fully open position, a portion of the body portion moves into place within a receiving slot defined within the second windshield portion to thereby maintain the second windshield portion in the open position.

11. The windshield system of claim 1, wherein:
   the windshield fastener is a first windshield fastener;
   the windshield fastener receiving opening is a first windshield fastener receiving opening;
   the second windshield portion defines a second windshield fastener receiving opening, said second windshield fastener receiving opening being a cutout in the second windshield portion;
   the windshield system further comprises a second windshield fastener that is adapted for maintaining the second windshield portion in the closed position; and
   at least a portion of the second windshield fastener is disposed within the second windshield fastener receiving opening.

12. The windshield system of claim 11, wherein:
   the second windshield fastener comprises a substantially U-shaped body portion; the substantially U-shaped body portion comprises:
      a substantially planar rear portion,
      a substantially planar connector portion that extends outwardly from and generally perpendicular to, the rear portion, and
      a substantially planar front portion that extends outwardly from, and generally perpendicular to, the connector portion; and
   the substantially U-shaped body portion is made of a flexible material so that the connector portion and the front portion may be moved relative to the rear portion.

13. The windshield system of claim 12, wherein the windshield system is adapted so that, in order to move the second windshield portion from the open to the closed position and to maintain the windshield portion in the closed position:
   (A) a user rotates the second windshield portion from the open position toward a fully closed position;
   (B) just before the second windshield portion reaches the fully closed position, the user manually flexes the second windshield fastener's front and connector portions so that a support pole adjacent which the windshield system is disposed is received within an interior portion defined by the front and connector portions of the second windshield fastener; and
   (C) after the step (B), the user releases the front and connector portions so that the windshield fastener extends around the support pole and thereby holds the second windshield portion in a closed position.

14. A windshield system comprising:
   a first windshield portion;
   a second windshield portion connected to rotate between:
      (1) a closed position, in which the second windshield portion is substantially coplanar with the first windshield portion, and (2) an open position, in which the first and second windshield portions are spaced apart from, and co-facing, each other, the second windshield portion defining a windshield fastener receiving opening, said windshield fastener receiving opening being a cutout in the second windshield portion; and
   a windshield fastener that is adapted for maintaining the second windshield portion in the closed position, wherein:
   at least a portion of the windshield fastener is disposed within the windshield fastener receiving opening.

15. The windshield system of claim 14, wherein:
   when the second windshield portion is in the closed position, the second windshield portion is disposed above the first windshield portion.

16. The windshield system of claim 14, wherein:
   frictional contact between the windshield fastener and the second windshield portion serves to maintain the windshield fastener in place relative to the second windshield portion.

17. The windshield system of claim 14, wherein:
   the windshield fastener receiving opening is a first windshield fastener receiving opening;
   the windshield fastener is a first windshield fastener;
   the second windshield portion defines a second windshield fastener receiving opening said second windshield fastener receiving opening being a cutout in the second windshield portion;
   the windshield system further comprises a second windshield fastener that is adapted for maintaining the second windshield portion in the closed position;
   at least a portion of the second windshield fastener is disposed within the second windshield fastener receiving opening; and
   frictional contact between the second windshield fastener and the second windshield portion serves to maintain the second windshield fastener in place relative to the second windshield portion.

18. The windshield system of claim 14, wherein:
   the windshield fastener comprises:
   a body portion,
   a head portion, and
   a neck portion extending between the head portion and the body portion;
   frictional contact between the windshield fastener and the second windshield portion serves to maintain the windshield fastener in place relative to the second windshield portion; and
   the head and neck portions are dimensioned to hold the body portion in place relative to the second windshield portion.

19. The windshield system of claim 18, wherein:
   the head and neck portions are adapted to allow a user to insert the head portion through the windshield fastener receiving opening so that an inner surface of the head portion is adjacent an interior surface of the second windshield portion and so that the neck portion is disposed within the windshield fastener receiving opening.

20. The windshield system of claim 19, wherein the thickness of the neck portion is substantially equal to a thickness of the second windshield portion.

21. The windshield system of claim 20, wherein a cross section of the windshield fastener receiving opening is about the same size and shape as a cross-section of the neck portion.

22. The windshield system of claim 20, wherein the windshield fastener receiving opening is an elongate slot.

23. The windshield system of claim 18, wherein the body portion comprises:
- a substantially planar rear portion;
- a substantially planar connector portion that extends outwardly from and generally perpendicular to, the rear portion; and
- a front, substantially planar front portion that extends outwardly from, and generally perpendicular to, the connector portion.

24. The windshield system of claim 23, wherein the rear portion, connector portion, and front portion cooperate to form a substantially U-shaped structure.

25. The windshield system of claim 24, wherein the U-shaped structure is made of a flexible material so that the connector portion and the front portion may be moved relative to the rear portion.

26. The windshield system of claim 25, wherein the windshield system is adapted so that, in order to move the second windshield portion from the open to the closed position and to maintain the windshield portion in the closed position:
- (A) a user rotates the second windshield portion from the open position toward a fully closed position;
- (B) just before the second windshield portion reaches the fully closed position, the user manually flexes the windshield fastener's front and connector portions so that a support pole adjacent which the windshield system is attached is received within an interior portion defined by the front and connector portions of the windshield fastener; and
- (C) after the step (B), the user releases the front and connector portions so that the windshield fastener extends around the support pole and thereby holds the second windshield portion in a closed position.

27. The windshield system of claim 14, wherein:

the windshield fastener is a first windshield fastener;

the windshield fastener receiving opening is a first windshield fastener receiving opening;

the second windshield portion defines a second windshield fastener receiving opening, said second windshield fastener receiving opening being a cutout in the second windshield portion;

the windshield system further comprises a second windshield fastener that is adapted for maintaining the second windshield portion in the closed position; and at least a portion of the second windshield fastener is disposed within the second windshield fastener receiving opening.

* * * * *

UNITED STATES PATENT AND TRADEMARK OFFICE
CERTIFICATE OF CORRECTION

| | | |
|---|---|---|
| PATENT NO. | : 7,380,860 B2 | Page 1 of 1 |
| APPLICATION NO. | : 11/551594 | |
| DATED | : June 3, 2008 | |
| INVENTOR(S) | : Dolan and Hoffman | |

It is certified that error appears in the above-identified patent and that said Letters Patent is hereby corrected as shown below:

Title page,

(76) Inventor: add second inventor --Robert E. Hoffman, North Augusta, SC (US)--.

Signed and Sealed this

Ninth Day of February, 2010

David J. Kappos
*Director of the United States Patent and Trademark Office*